United States Patent
Tripathi et al.

(10) Patent No.: US 7,088,770 B2
(45) Date of Patent: Aug. 8, 2006

(54) ADAPTIVE TURBO DECISION FEEDBACK EQUALIZATION METHOD AND DEVICE

(75) Inventors: Vinayak Tripathi, Schaumburg, IL (US); Michael L. Honig, Evanston, IL (US)

(73) Assignee: Motorola, Inc., Schaumburg, IL (US)

( * ) Notice: Subject to any disclaimer, the term of this patent is extended or adjusted under 35 U.S.C. 154(b) by 967 days.

(21) Appl. No.: 10/046,444

(22) Filed: Oct. 19, 2001

(65) Prior Publication Data

US 2003/0095593 A1    May 22, 2003

(51) Int. Cl.
- H03H 7/30   (2006.01)
- H04B 3/20   (2006.01)
- H04B 7/216  (2006.01)

(52) U.S. Cl. .................. 375/233; 370/286; 370/342
(58) Field of Classification Search .............. 375/233, 375/232

See application file for complete search history.

(56) References Cited

U.S. PATENT DOCUMENTS

| | | | | |
|---|---|---|---|---|
| 6,167,082 A | * | 12/2000 | Ling et al. | 375/233 |
| 6,201,796 B1 | * | 3/2001 | Agazzi et al. | 370/286 |
| 6,563,812 B1 | * | 5/2003 | De | 370/342 |
| 6,690,723 B1 | * | 2/2004 | Gosse et al. | 375/233 |

OTHER PUBLICATIONS

Carlo Luschi, Magnus Sandell, Paul Strauch, Jian-Jun Wu, Costel Ilas, Ping-Wenong, Romain Baeriswyl, Frederic Battaglia, Spyros Karageorgis, Ran-Hong Yan; "Advanced Signal-Processing Algorithms for Energy-Efficient Wireless Communications"; IEEE, vol. 88, No. 10, Oct. 2000, pp. 1633-1650.

I. Fijalkow, A. Roumy, S. Ronger, D. Pirez, P. Vila; "Improved Interference Cancellation for Turbo-Equalization"; IEEE, 2000, pp. 416-419.

Christophe Laot, Alain Glavieux, and Joel Labat; "Turbo Equalization: Adaptive Equalization and Channel Decoding Jointly Optimized"; IEEE Journal on Selected Areas in Communications, vol. 19, No. 9, Sep. 2001, pp. 1744-1752.

Michael Tuchler, Ralf Koetter, Andrew Singer; "Iterative Correction of ISI via Equalization and Decoding with Priors"; IEEE, ISIT 2000, Sorrento, Italy, Jun. 25-30, 2000; pp. 100.

Dan Raphaeli and Yoram Zarai; "Combine turbo Equalization and Turbo Decoding"; IEEE Communications Letters, vol. 2, No. 4, Apr. 1998, pp. 107-109.

* cited by examiner

*Primary Examiner*—Chieh M. Fan
*Assistant Examiner*—Cicely Ware

(57) ABSTRACT

The invention provides an adaptive turbo decision feedback equalizer for executing an adaptive turbo decision feedback equalization method in response to a reception a packet including samples transmitted to the adaptive turbo decision feedback equalizer via a channel. The adaptive turbo decision feedback equalizer generates a first set of soft estimates of bits based upon a computation of a first feed-forward filter and a first feedback filter as a function of an estimation of the channel. The adaptive turbo decision feedback equalizer subsequently generates additional sets of soft estimates of the bits and a set of hard estimates of the bits based upon a computation of additional feed-forward filters and additional feedback filters as a function of a plurality of additional soft symbol estimates.

27 Claims, 3 Drawing Sheets

ADAPTIVE TURBO DECISION FEEDBACK EQUALIZATION METHOD AND DEVICE

FIELD OF THE INVENTION

The present invention generally relates to the field of communication systems. More specifically, the invention relates to turbo decision-feedback equalization techniques implemented in a cellular system operating with a multi-path channel.

BACKGROUND OF THE INVENTION

The capacity of a cellular system operating with a multi-path channel can be limited by a demodulator's ability to mitigate the degradations of the received signal due to the multi-path channel. One receiver known in the art for receiving coded transmissions over a multi-path channel is a maximum likelihood sequence estimator ("MLSE") that operates to jointly demodulate the channel and the error correction code. However, the complexity of an MLSE is proportional to $P^{L+K}$, where P is the number of points in a signal constellation, K is the number of stages in a convolutional code shift register, and L is the number of symbol spaced taps of the multi-path channel. Such complexity impedes an implementation of the MLSE into a cellular system.

Another known receiver for receiving coded transmissions over a multi-path channel is a turbo decision-feedback equalizer ("TDFE") having feed-forward filters and feedback filters that are based upon an estimation of the multi-path channel. While the complexity of the TDFE does not impede the implementation of the TDFE into a cellular system, a problem with the TDFE is the computation of the filters assumes perfect feedback that is not attained in practice.

Therefore, there is a need for an adaptive TDFE. The present invention addresses this need.

SUMMARY OF THE INVENTION

One form of the invention is a method for decoding a packet transmitted over a channel with the packet including a plurality of samples. First, a first set of soft estimates of a plurality of bits is generated based upon a computation of a first feed-forward filter and a first feedback filter as a function of an estimate of the channel. Second, a second set of soft estimates of the plurality of bits is generated based upon a computation of a second feed-forward filter and a second feedback filter as a function of a first set of soft symbol estimates.

A second form of the invention is a device decoding a packet transmitted over a channel with the packet including a plurality of samples. The device includes means for generating a first set of soft estimates of a plurality of bits based upon a computation of a first feed-forward filter and a first feedback filter as a function of an estimate of the channel, and means for generating a second set of soft estimates of the plurality of bits based upon a computation of a second feed-forward filter and a second feedback filter as a function of a first set of soft symbol estimates.

A third form of the present invention is a computer readable medium storing a computer program comprising computer readable code for generating a first set of soft estimates of a plurality of bits based upon a computation of a first feed-forward filter and a first feedback filter as a function of an estimate of the channel, and computer readable code for generating a second set of soft estimates of the plurality of bits based upon a computation of a second feed-forward filter and a second feedback filter as a function of a first set of soft symbol estimates.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
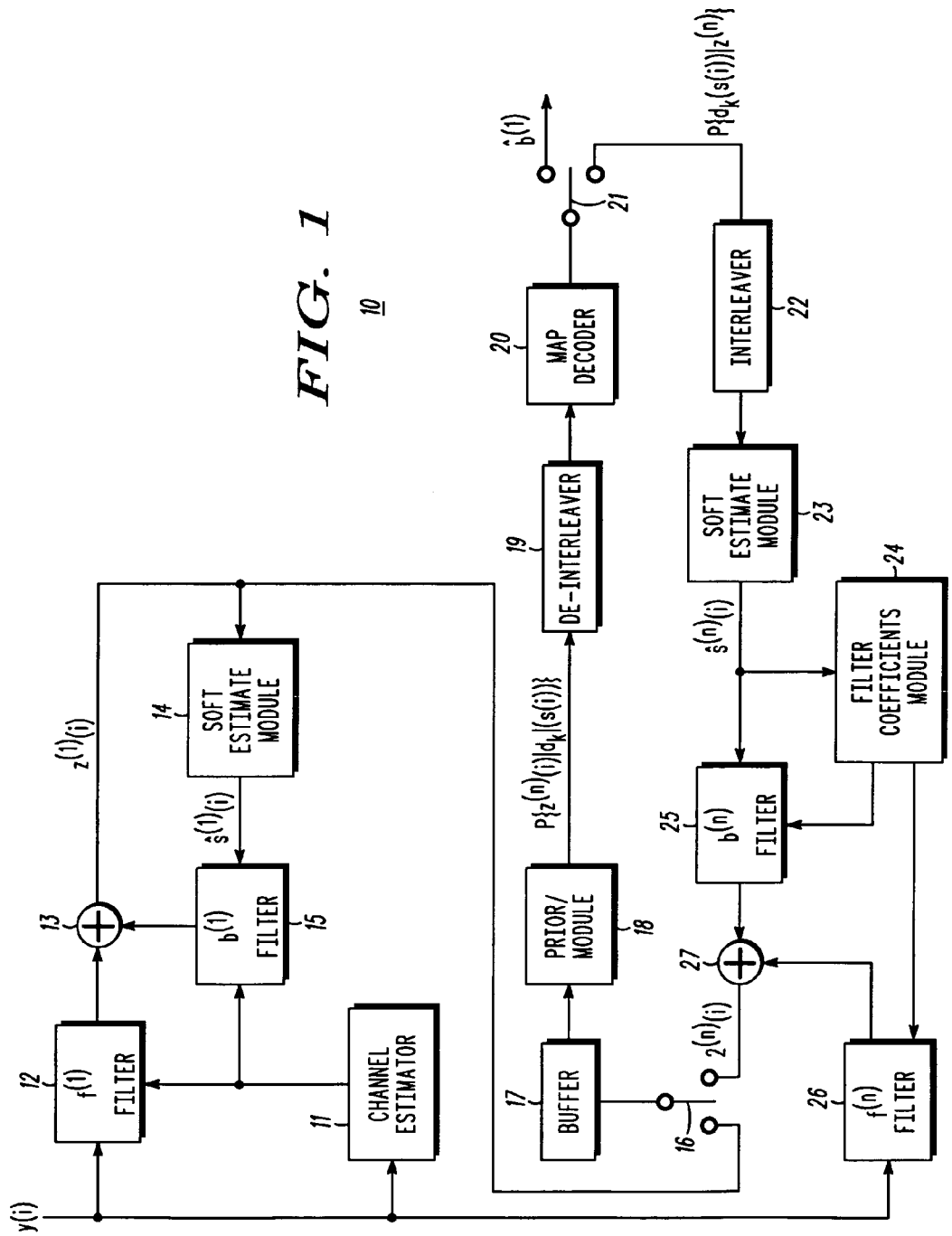
FIG. 1 is a block diagram of one embodiment of an adaptive turbo decision feedback equalizer for receiving a packet over a channel in accordance with the present invention.

FIG. 1 illustrates an adaptive turbo decision-feedback equalizer 10 ("adaptive TDFE 10") in accordance with one embodiment of the present invention. From the subsequent description herein of the adaptive TDFE 10, those having ordinary skill in the art will appreciate an employment of the adaptive TDFE 10 into a receiver whereby a transmitter transmits a packet including a M Q-ary modulated data symbols and training symbols containing bits, and the adaptive TDFE 10 receives a packet y including samples y(i) corresponding to the data symbols and training symbols. In one embodiment, the transmitted packet contains 8-Phase Shift Keying (8-PSK) symbols wherein samples y(i) are represented by the following equation [1]:

$$y(i) = Hs(i) + n(i) \qquad [1]$$

where the vector of received samples y(i) in the packet y is given by the following equation [2]:

$$y(i) = \begin{bmatrix} y_{i+\delta-1} \\ y_{i+\delta-2} \\ \vdots \\ y_{i+\delta-N_f} \end{bmatrix}, \qquad [2]$$

the Toeplitz channel impulse response matrix H of dimensions $N_f \times (N_f + L - 1)$ is given by the following equation [3]:

$$H = \begin{bmatrix} h_0 & \cdots & h_{L-1} & 0 & \cdots & \cdots & 0 \\ 0 & h_0 & \cdots & h_{L-1} & & & \vdots \\ \vdots & & \ddots & & \ddots & & \vdots \\ 0 & \cdots & \cdots & & h_0 & \cdots & h_{L-1} \end{bmatrix} \qquad [3]$$

and, the transmitted symbol vector s(i) is defined in accordance with the following equation [4]:

$$s(i) = \begin{bmatrix} s_{i+\delta-1} \\ s_{i+\delta-2} \\ \vdots \\ s_i \\ \vdots \\ s_{i+\delta-N_f-L-1} \end{bmatrix} \quad [4]$$

In the equations [1]–[4], s(i) represents three coded bits $\{d_k(s(i)), k=1,2,3\}$; n(i) is a vector of noise samples; $N_f$ is the length of a feed-forward filter 12; and δ is a delay for optimizing the adaptive TDFE 10.

Figure 2:
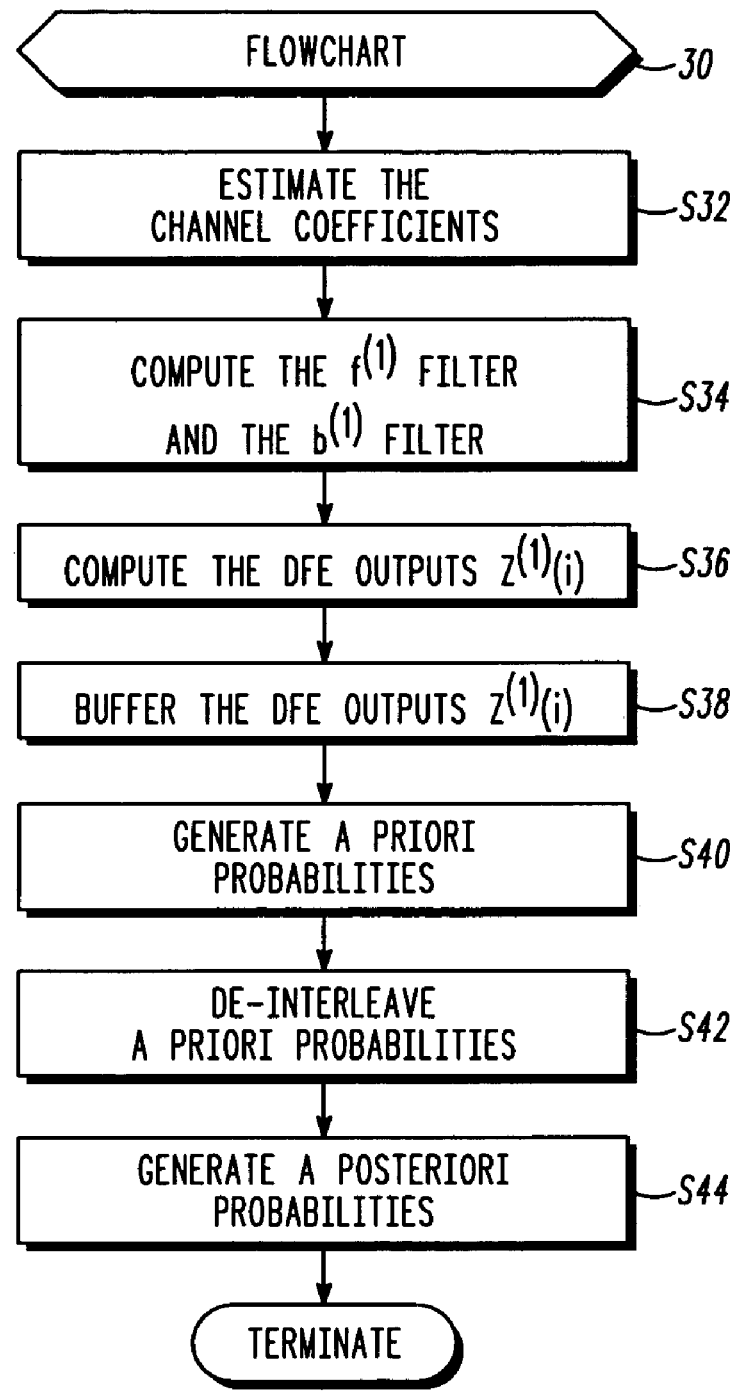
FIG. 2 is a flowchart illustrating one embodiment of a decision feedback equalization method for generating soft estimates of the bits as known in the art.
Figure 3:
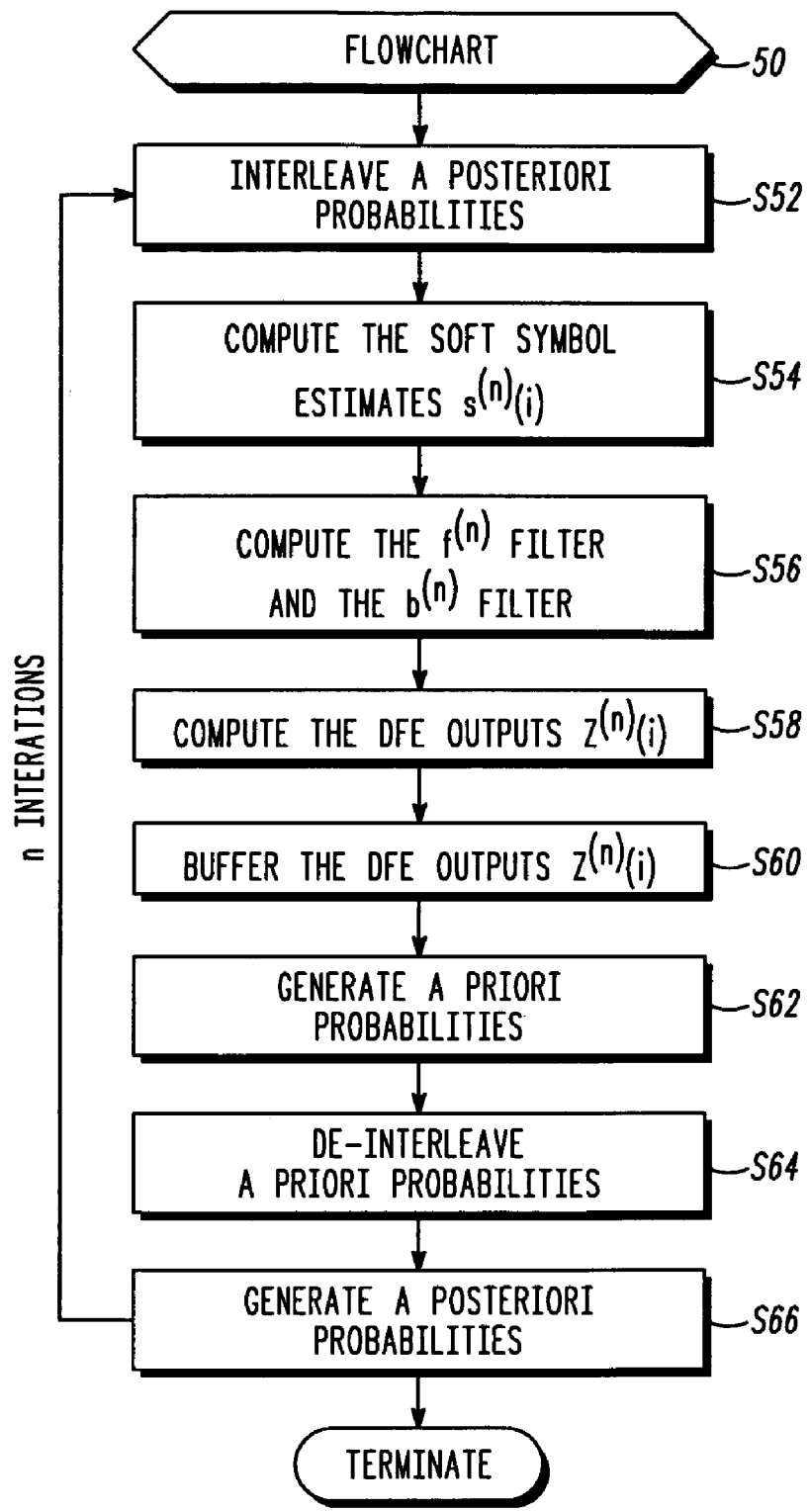
FIG. 3 is a flowchart illustrating one embodiment of an adaptive decision feedback equalization method for generating soft and hard estimates of the bits in accordance with the present invention.

In response to a reception of the packet y, the adaptive TDFE 10 executes a flowchart 30 as illustrated in the FIG. 2 and a flowchart 50 as illustrated in the FIG. 3. The flowchart 30 is representative of a decision feedback equalization method for generating a soft estimate of bits within the transmitted packet, and the flowchart 50 is representative of an adaptive decision feedback equalization method for generating soft estimates and hard estimates of the bits within the transmitted packet. The various components of the adaptive TDFE 10 will now be described herein in the context of a sequential execution of the flowchart 30 and the flowchart 50.

Referring to FIGS. 1 and 2, the adaptive TDFE 10 has a first component stage for executing the flowchart 30. This first component stage includes a channel estimator 11, a feed-forward filter 12 ("$f^{(1)}$ filter 12"), an adder 13, a soft estimate module 14, and a feedback filter 15 ("$b^{(1)}$ filter 15") constituting a decision feedback equalizer ("DFE"). The first component stage further includes a switch 16, a buffer 17, an a priori probability module 18 ("a priori module 18"), a de-interleaver 19, and a Map decoder 20. During a block S32 of the flowchart 30, the channel estimator 11 estimates the channel coefficients. In one embodiment, the channel estimator 11 estimates the channel coefficients in accordance with the following equations [5] and [6]:

$$[\hat{h}_0, \hat{h}_1, \ldots \hat{h}_{L-1}]^1 = \arg\min_h \|y_T - Th\|^2 = (T^H T)^{-1} T^H y_T \quad [5]$$

$$\hat{\sigma}_n^2 = \frac{1}{T}\|y_T - T\hat{h}\|^2 \quad [6]$$

where $y_T$ is the T×1 vector of the received training symbols represented by the following equation [7]:

$$y_T = \begin{bmatrix} y_L \\ y_{L+1} \\ \vdots \\ y_T \end{bmatrix} \quad [7]$$

and the matrix T is a Toeplitz matrix of transmitted training symbols $s_i$ that is given by the following equation [8]:

$$T = \begin{bmatrix} s_L & s_{L-1} & \cdots & s_1 \\ \vdots & \vdots & \vdots & \vdots \\ s_T & s_{T-1} & \cdots & s_{T-L} \end{bmatrix} \quad [8]$$

Upon completion of the block S32, the adaptive TDFE 10 proceeds to a block S34 to compute the $f^{(1)}$ filter 12 and the $b^{(1)}$ filter 15 as a function of the channel coefficients. In one embodiment, the $f^{(1)}$ filter 12 and the $b^{(1)}$ filter 15 are computed in accordance with the following equations [9] and [10]:

$$f^{(1)} = (\hat{H}_{1\delta}\hat{H}_{1\delta}^H + \hat{\sigma}_n^2 I)^{-1}\hat{h}_\delta \quad [9]$$

$$b^{(1)}(k) = \begin{cases} 0, & k = 1:\delta-1 \\ (f^{(1)})^H \hat{h}_k, & k = \delta:N_f+L-1 \end{cases} \quad [10]$$

where the $H_{1:\delta}$ represents columns in 1 through δ of the estimated channel matrix H; $\hat{h}_k$ represents the $k^{th}$ column of the estimated channel matrix H; and $\hat{h}_\delta$ represents the the $\delta^{th}$ column of the estimated channel matrix H.

Upon completion of the block S34, the adaptive TDFE 10 proceeds to a block S36 wherein the packet y and the soft estimates $s^{(1)}(i)$ are filtered through the $f^{(1)}$ filter 12 and the $b^{(1)}$ filter 15, respectively, to obtain DFE outputs $z^{(1)}(i)$. In one embodiment, the adder 13 provides the DFE outputs $z^{(1)}(i)$ in accordance with the following equation [11]:

$$z^{(1)}(i) = (f^{(1)})^H y(i) + (b^{(1)})^H \hat{s}^{(1)}(i) \quad [11]$$

where the soft estimate module 14 estimates the soft feedback symbols $\hat{s}^{(1)}(i)$ in accordance with the following equations [12]–[17]:

$$\hat{s}^{(1)}(i) \equiv E[z^{(1)}(i)|s(i)] = \sum_{k=0}^{7} P\left(z^{(1)}(i)|s(i) = e^{j\frac{\pi k}{4}}\right) \cdot e^{j\frac{\pi k}{4}} \quad [12]$$

$$P\left(z^{(1)}(i)|s(i) = e^{j\frac{m\pi}{4}}\right) = \prod_{k=1}^{3} P\left(z^{(1)}(i)|d_k(s(i)) = d_k\left(e^{j\frac{m\pi}{4}}\right)\right), \quad [13]$$

for m = 0, 1, … 7

$$P(z^{(1)}(i)|d_k(s(i)) = \pm 1) = \sum_{s \in \Omega^\pm} k_s \frac{1}{\sqrt{2\pi\sigma^2}} \exp\left(\frac{-|z^{(1)}(i) - \mu s|^2}{\sigma^2}\right), \quad [14]$$

$$k_s = \frac{P(\text{Transmitted Symbol} = s)}{\sum_{s' \in \Omega^\pm} P(\text{Transmitted Symbol} = s')} \quad [15]$$

$$E[z^{(1)}(i)\|s(i)] = \mu s(i) = |(f^{(1)})^H \hat{h}_\delta|s(i) \quad [16]$$

$$Var[z^{(1)}(i)\|s(i)] = \sigma^2 = \sigma_n^2 \|f^{(1)}\|^2 + \|(f^{(1)})^H H_{1\delta}\|^2 \quad [17]$$

where $\{d_k(s(i)), k=1, 2, 3\}$ are the bits which correspond to $s^{(1)}(i)$; $\Omega^\pm$ is the set of symbols which correspond to the value of $d_k(s(i))$; and $k_s$ is a normalization factor.

Upon completion of the block S36, the adaptive TDFE 10 proceeds to a block S38 of the flowchart 30 to set switch 16 to provide the output $z^{(1)}(i)$ to the buffer 17. In response thereto, the buffer 17 stores the DFE outputs $z^{(1)}(i)$.

Upon completion of the block S38, the adaptive TDFE 10 proceeds to a block S40 of the flowchart 30 to generate a priori probabilities $P\{z^{(n)}(i)|d_k(s(i))\}$. In one embodiment, the priori module 18 generates the a priori probabilities $P\{z^{(n)}(i)|d_k(s(i))\}$. in accordance with the following equations [18]–[21]

$$\mu_m = \frac{1}{M+T} \sum_{i=0}^{M+l-1} |(\hat{s}^{(n)}(i))^* z^{(n)}(i)| \quad [18]$$

$$\sigma_m^2 = \frac{1}{M+T} \sum_{i=0}^{M+T-1} |(\hat{s}^{(n)}(i))^* z^{(n)}(i) - \mu_m|^2 \quad [19]$$

$$P(z^{(1)}(i) | d_k(s(i)) = \pm 1) = \sum_{s \in \Omega^{\pm}} k_s \frac{1}{\sqrt{2\pi\sigma_m^2}} \exp\left(\frac{-|z^{(1)}(i) - \mu_m s|^2}{\sigma_m^2}\right), \quad [20]$$

$$k_s = \frac{P(\text{Transmitted Symbol} = s)}{\sum_{s' \in \Omega^{\pm}} P(\text{Transmitted Symbol} = s')} \quad [21]$$

Upon completion of block S40, the adaptive TDFE 10 proceeds to a block S42 of the flowchart 30 wherein the de-interleaver 19 conventionally de-interleaves the a priori probabilities $P\{z^{(n)}(i)|d_k(s(i))\}$ and feeds them to the MAP decoder 20. In response thereto, during a block S44 of the flowchart 30, the MAP decoder 20 generates a soft estimate of the bits in the form of a posteriori probabilities $P\{d_k(s(i))|z^{(1)}\}$. In one embodiment, the MAP decoder 20 implements a conventional Bahl-Coch-Jelinek-Raviv ("BCJR") algorithm to generate a posteriori probabilities $P\{d_k(s(i))|z^{(1)}\}$.

The flowchart 30 is terminated upon completion of block S44.

Referring to FIGS. 1 and 3, the adaptive TDFE 10 has a second component stage for executing the flowchart 50 immediately upon termination of the flowchart 30. The second component stage includes the switch 16, the buffer 17, the a priori module 18, the de-interleaver 19, the MAP decoder 20, a switch 21, and an interleaver 22. The second component stage further includes a soft estimates module 23, a filter coefficients module 24, a feedback filter 25 ("$b^{(n)}$ filter 25"), a feed-forward filter 26 ("$f^{(n)}$ filter 26"), and an adder 27 constituting an adaptive decision feedback equalizer.

During a block S52 of the flowchart 50, the switch 21 is set to provide the a posteriori probabilities $P\{d_k(s(i))|z^{(n)}\}$ to the interleaver 22. In response thereto, the interleaver 22 conventionally interleaves the a posteriori probabilities $P\{d_k(s(i))|z^{(n)}\}$. Upon completion of the block S52, the adaptive TDFE 10 proceeds to a block S54 of the flowchart 50 wherein the soft estimates module 23 computes soft estimates of the transmitted symbols $s^{(n)}(i)$ in accordance with the following equations [22] and [23]:

$$\hat{s}^{(n)}(i) \equiv E[s(i) | z^{(n)}] = \sum_{k=0}^{7} P\left(s(i) = e^{j\frac{\pi k}{4}} \mid z^{(n)}\right) \cdot e^{j\frac{\pi k}{4}} \quad [22]$$

$$P\left(s(i) = e^{j\frac{m\pi}{4}} \mid z^{(n)}\right) = \prod_{k=1}^{3} P\left(d_k(s(i)) = d_k\left(e^{j\frac{m\pi}{4}}\right) \mid z^{(n)}(i)\right), \quad [23]$$

for $m = 0, 1, \ldots 7$

Upon completion of block S54, the adaptive TDFE 10 proceeds to block S56 of the flowchart 50 wherein the filter coefficients module 24 computes the $b^{(n)}$ filter 25 and the $f^{(n)}$ filter 26 in accordance with the following equations [24]–[27]:

$$x = \begin{bmatrix} y(i) \\ \hat{s}_\delta^{(n)}(i) \end{bmatrix} \quad [24]$$

$$\begin{bmatrix} f^{(n)} \\ b^{(n)} \end{bmatrix} = R_{xx}^{-1} R_{x\hat{s}^{(n)}}, \text{ where} \quad [25]$$

$$R_{xx} = \sum_{l=0}^{M-1} x(i) x^H(i) \quad [26]$$

$$R_{x\hat{s}^{(n)}} = \sum_{l=0}^{M-1} x(i) (\hat{s}^{(n)}(i))^* \quad [27]$$

where $\hat{s}_\delta^{(n)}(i)$ is the vector $\hat{s}^{(n)}(i)$ whose $\delta^{th}$ element has been set to zero.

Upon completion of the block S56, the adaptive TDFE 10 proceeds to a block S58 of the flowchart 50 wherein the packet y and the soft symbol estimates $s^{(n)}(i)$ are filtered through the $f^{(n)}$ filter 26 and the $b^{(n)}$ filter 25, respectively, to obtain DFE outputs $z^{(n)}(i)$. In one embodiment, the adder 27 computes the DFE outputs $z^{(n)}(i)$ in accordance with the following equation [28]:

$$z^{(n)}(i) = (f^{(n)})^H y(i) + (b^{(n)})^H \hat{s}^{(n)}(i) \quad [28]$$

Upon completion of the block S58, the adaptive TDFE 10 proceeds to a block S60 of the flowchart 50 to set switch 16 to provide the DFE outputs $z^{(n)}(i)$ to the buffer 17. In response thereto, the buffer 17 stores the DFE outputs $z^{(n)}(i)$.

Upon completion of the block S60, the adaptive TDFE 10 proceeds to a block S62 of the flowchart 50 to generate a priori probabilities $P\{z^{(n)}(i)|d_k(s(i))\}$. In one embodiment, the priori module 18 generates the a priori probabilities $P\{z^{(n)}(i)|d_k(s(i))\}$ in accordance with the following equations [29]–[31]

$$\mu_m = \frac{1}{M+T} \sum_{i=0}^{M+T-1} \left|(\hat{s}^{(n)}(i))^* z^{(n)}(i)\right| \quad [29]$$

$$\sigma_m^2 = \frac{1}{M+T} \sum_{i=0}^{M+T-1} \left|(\hat{s}^{(n)}(i))^* z^{(n)}(i) - \mu_m\right|^2 \quad [30]$$

$$P(z^{(1)}(i)) | d(i, j)) = \pm 1 \cong \sum_{S \in \Omega} \frac{1}{\sqrt{2\pi\sigma_m^2}} \exp\left(\frac{-|z^{(1)}(i) - \mu_m s|^2}{\sigma_m^2}\right) \quad [31]$$

Upon completion of block S62, the adaptive TDFE 10 proceeds to a block S64 of the flowchart 50 wherein the de-interleaver 19 conventionally de-interleaves a priori probabilities $P\{z^{(n)}(i)|d_k(s(i))\}$ and feeds them to the MAP decoder 20. In response thereto, during a block S66 of the flowchart 50, the MAP decoder 20 generates either a soft estimate of the bits in the form of a posteriori probabilities $P(d_k(s(i))|z^{(n)})$. In one embodiment, the Map decoder 20 implements a BCJR algorithm to generate a posteriori probabilities $P\{d_k(s(i)|z^{(n)})\}$.

The flowchart 50 is immediately terminated upon a completion of the block S66 when only one iteration of blocks S52–S66 is contemplated. With one completed iteration, the switch 21 is set to provide the a posteriori probabilities $P(d_k(s(i))|z^{(n)})$ as hard estimates $\hat{b}(i)$ of the bits. Thus, the soft symbol estimates $s^{(n)}(i)$, the $b^{(n)}$ filter 25 and the $f^{(n)}$ filter 26 are computed only once when only one iteration of blocks S52–S66 is contemplated.

Preferably, the flowchart 50 is terminated after plurality of n iterations (e.g., 4 iterations) of the blocks S52–S66 as shown in FIG. 3. As such, the switch 21 is set to provide the a posteriori probabilities $P\{d_k(s(i)|z^{(n)}\}$ to the interleaver 22 upon completion of each intermediate iteration of the blocks S52–S66, and the switch 21 is set to provide the a posteriori probabilities $P\{d_k(s(i)|z^{(n)}\}$ as hard estimates $\hat{b}(i)$ of the bits upon completion of the final iteration of the blocks S52–S66. Those having ordinary skill in the art will appreciate the repeated computations of the soft symbol estimates $s^{(n)}(i)$, the $b^{(n)}$ filter 25 and the $f^{(n)}$ filter 26 during the multiple iterations of the blocks S52–S66 in effect produce separate and distinct soft symbol estimates $s^{(n)}(i)$, $b^{(n)}$ filters 25 and $f^{(n)}$ filters 26 for each iteration.

The illustrated embodiments of the present invention may be implemented in hardware, software stored on a computer readable medium, or combinations of hardware and software. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for decoding a packet transmitted over a channel, the packet including a plurality of samples, said method comprising:
   in a first iteration, generating a first set of soft estimates of bits based upon a computation of a first feed-forward filter and a first feedback filter as a function of an estimate of the channel; and
   in a second iteration, generating a second set of soft estimates of bits based upon a computation of a second feed-forward filter and a second feedback filter as a function of a first set of soft symbol estimates obtained during the first iteration.

2. The method of claim 1, further comprising:
   generating a set of hard estimates of bits based upon a computation of the second feed-forward filter and the second feedback filter as a function of a second set of soft symbol estimates.

3. A device for decoding a packet transmitted over a channel, the packet including a plurality of samples, said device comprising:
   means for generating in a first iteration, a first set of soft estimates of bits based upon a computation of a first feed-forward filter and a first feedback filter as a function of an estimate of the channel; and
   means for generating in a second iteration, a second set of soft estimates of bits based upon a computation of a second feed-forward filter and a second feedback filter as a function of a first set of soft symbol estimates obtained during the first iteration.

4. The device of claim 3, further comprising:
   means for generating a set of hard estimates of bits based upon a computation of the second feed-forward filter and the second feedback filter as a function of a second set of soft symbol estimates.

5. A method for decoding a packet transmitted over a channel, the packet including a plurality of samples, said method comprising:
   providing a first set of soft symbol estimates; and
   computing a feed-forward filter and a feedback filter as a function of the first set of soft symbol estimates;

wherein the feed-forward filter and the feedback filter are computed according to:

$$x = \begin{bmatrix} y(i) \\ \hat{s}_\delta^{(n)}(i) \end{bmatrix}$$

$$\begin{bmatrix} f^{(n)} \\ b^{(n)} \end{bmatrix} = R_{xx}^{-1} R_{x\hat{s}^{(n)}}, \text{ where}$$

$$R_{xx} = \sum_{i=0}^{M-1} x(i) x^H(i)$$

$$R_{x\hat{s}^{(n)}} = \sum_{i=0}^{M-1} x(i)\left(\hat{s}^{(n)}(i)\right)^*$$

wherein $y(i)$ is the samples, $\hat{s}_\delta^{(n)}(i)$ is the soft symbol estimate whose $\delta$th delay element has been set to zero, $f^{(n)}$ is the feed-forward filter, and $b^{(n)}$ is the feedback filter, M is a number of data symbols in a packet and H is a Hermitian transpose.

6. The method of claim 5, further comprising:
   filtering the plurality of samples through the feed-forward filter; and
   filtering the first set of soft symbol estimates through the feedback filter.

7. The method of claim 6, further comprising:
   providing a first set of decision feedback equalization outputs in response to a filtering of the plurality of samples through the feed-forward filter and a filtering of the first set of soft symbol estimates through the feedback filter.

8. The method of claim 7, wherein the a first set of decision feedback equalization outputs are computed according to:

$$z^{(n)}(i) = (f^{(n)})^H y(i) + (b^{(n)})^H \hat{s}^{(n)}(i).$$

9. The method of claim 7, further comprising:
   providing a second set of soft symbol estimates; and
   computing the feed-forward filter and the feedback filter as a function of the second set of soft symbol estimates.

10. The method of claim 9, further comprising:
    filtering the plurality of samples through the feed-forward filter; and
    filtering the second set of soft symbol estimates through the feedback filter.

11. The method of claim 10, further comprising:
    providing a second set of decision feedback equalization outputs in response to a filtering of the plurality of samples through the feed-forward filter and a filtering of the second set of soft symbol estimates through the feedback filter.

12. A device for decoding a packet transmitted over a channel, the packet including a plurality of samples, said device comprising:
    a soft symbol estimator providing a first set of soft symbol estimates in response to a reception of the packet by said device;
    a feed-forward filter computed as a function of the first set of soft symbol estimates; and
    a feedback filter computed as a function of the first set of soft symbol estimates;
    wherein said feed-forward filter and said feedback filter are computed according to:

$$x = \begin{bmatrix} y(i) \\ \hat{s}_\delta^{(n)}(i) \end{bmatrix}$$

$$\begin{bmatrix} f^{(n)} \\ b^{(n)} \end{bmatrix} = R_{xx}^{-1} R_{x\hat{s}^{(n)}}, \text{ where}$$

$$R_{xx} = \sum_{i=0}^{M-1} x(i) x^H(i)$$

$$R_{x\hat{s}^{(n)}} = \sum_{i=0}^{M-1} x(i) \left( \hat{s}^{(n)}(i) \right)^*$$

wherein y(i) is the samples, $\hat{s}_\delta^{(n)}(i)$ is the soft symbol estimate whose δth delay element has been set to zero, $f^{(n)}$ is the feed-forward filter, and $b^{(n)}$ is the feedback filter, M is a number of data symbols in a packet and H is a Hermitian transpose.

13. The device of claim 12, wherein
said feed-forward filter filters the plurality of samples upon a computation of said feed-forward filter; and
said feedback filter filters the first set of soft symbol estimates upon a computation of said feedback filter.

14. The device of claim 13, further comprising:
an adder providing a first set of decision feedback equalization outputs in response to a filtering of the plurality of samples through said feed-forward filter and a filtering of the first set of soft symbol estimates through said feedback filter.

15. The device of claim 14, wherein the a first set of decision feedback equalization outputs are computed in according to:

$$z^{(n)}(i) = (f^{(n)})^H y(i) + (b^{(n)})^H \hat{s}^{(n)}(i).$$

16. The device of claim 14, wherein:
said feed-forward filter is computed as a function of a second set of soft symbol estimates;
said feedback filter is computed as a function of the second set of soft symbol estimates,
said soft symbol estimator provides the second set of soft symbol estimates in response to said adder providing said first set of decision feedback equalization outputs.

17. The device of claim 16, wherein:
said feed-forward filters the plurality of samples upon a computation of said feed-forward filter; and
said feedback filter filters the second set of soft symbol estimates upon a computation of said feedback filter.

18. The device of claim 17, wherein
said adder further provides a second set of decision feedback equalization outputs in response to a filtering of the plurality of samples through said feed-forward filter and a filtering of the second set of soft symbol estimates through said feedback filter.

19. A computer readable medium storing a computer executable program code, the code, when executed, performing the steps comprising:
generating during a first iteration, a first set of soft estimates of a plurality of bits based upon a computation of a first feed-forward filter and a first feedback filter as a function of an estimate of a channel; and
generating during a second iteration, a second set of soft estimates of the plurality of bits based upon a computation of a second feed-forward filter and a second feedback filter as a function of a first set of soft symbol estimates obtained during the first iteration.

20. The computer readable medium of claim 19, further comprising:
generating a set of hard estimates of the plurality of bits based upon a computation of the second feed-forward filter and the second feedback filter as a function of a second set of soft symbol estimates.

21. A computer readable medium storing a computer executable program code, the code, when executed, performs the steps comprising:
providing a first set of soft symbol estimates; and
computing a feed-forward filter and a feedback filter as a function of the first set of soft symbol estimates;
wherein the first feed-forward filter and the first feedback filter are computed according to:

$$x = \begin{bmatrix} y(i) \\ \hat{s}_\delta^{(n)}(i) \end{bmatrix}$$

$$\begin{bmatrix} f^{(n)} \\ b^{(n)} \end{bmatrix} = R_{xx}^{-1} R_{x\hat{s}^{(n)}}, \text{ where}$$

$$R_{xx} = \sum_{i=0}^{M-1} x(i) x^H(i)$$

$$R_{x\hat{s}^{(n)}} = \sum_{i=0}^{M-1} x(i) \left( \hat{s}^{(n)}(i) \right)^*$$

wherein y(i) is the samples, $\hat{s}_\delta^{(n)}(i)$ is the soft symbol estimate whose δth delay element has been set to zero, $f^{(n)}$ is the feed-forward filter, and $b^{(n)}$ is the feedback filter, M is a number of data symbols in a packet and H is a Hermitian transpose.

22. The computer readable medium of claim 21, further comprising:
filtering the plurality of samples through the feed-forward filter; and
filtering the first set of soft symbol estimates through the feedback filter.

23. The computer readable medium of claim 22, further comprising:
providing a first set of decision feedback equalization outputs in response to a filtering of the plurality of samples through the feed-forward filter and a filtering of the first set of soft symbol estimates through the feedback filter.

24. The computer readable medium of claim 23, wherein the a first set of decision feedback equalization outputs are computed according to:

$$z^{(n)}(i) = (f^{(n)})^H y(i) + (b^{(n)})^H \hat{s}^{(n)}(i).$$

25. The computer readable medium of claim 23, further comprising:
providing a second set of soft symbol estimates; and
computing the feed-forward filter and the feedback filter as a function of the second set of soft symbol estimates.

26. The computer readable medium of claim 25, further comprising:
filtering the plurality of samples through the feed-forward filter; and
filtering the second set of soft symbol estimates through the feedback filter.

27. The computer readable medium of claim 26, further comprising:
providing a second set of decision feedback equalization outputs in response to a filtering of the plurality of samples through the feed-forward filter and a filtering of the second set of soft symbol estimates through the feedback filter.

* * * * *